US006336369B1

(12) United States Patent
Gomi et al.

(10) Patent No.: US 6,336,369 B1
(45) Date of Patent: Jan. 8, 2002

(54) STRAIGHT DOUBLE-TUBE TYPE CORIOLIS FLOW METER

(75) Inventors: Shingo Gomi; Kimihiro Ichinose; Osamu Futagawa; Kazuhide Kobayashi, all of Tokyo (JP)

(73) Assignee: Oval Corporation (JP)

( * ) Notice: Subject to any disclaimer, the term of this patent is extended or adjusted under 35 U.S.C. 154(b) by 0 days.

(21) Appl. No.: 09/381,608

(22) PCT Filed: Dec. 17, 1998

(86) PCT No.: PCT/JP99/05711

§ 371 Date: Sep. 22, 1999

§ 102(e) Date: Sep. 22, 1999

(87) PCT Pub. No.: WO99/37976

PCT Pub. Date: Jul. 29, 1999

(30) Foreign Application Priority Data

Jan. 23, 1998 (JP) .......................................... 10-010880

(51) Int. Cl.[7] ................................................. G01F 1/84
(52) U.S. Cl. ................................................. 73/861.357
(58) Field of Search ...................... 73/861.354, 861.355, 73/861.356, 861.357

(56) References Cited

U.S. PATENT DOCUMENTS 5,157,975 A * 10/1992 Tanaka et al. ......... 73/861.355
5,351,561 A * 10/1994 Wenger et al. ......... 73/861.357
5,814,739 A *  9/1998 Cleve .................... 73/861.357
5,850,039 A * 12/1998 Van Cleve et al. ..... 73/861.357

FOREIGN PATENT DOCUMENTS

| JP | 6-94501  | 4/1994  |
| JP | 6-174515 | 6/1994  |
| JP | 7-218309 | 8/1995  |
| JP | 8-304138 | 11/1996 |

* cited by examiner

Primary Examiner—Max Noori
(74) Attorney, Agent, or Firm—McGlew and Tuttle, P.C.

(57) ABSTRACT

A double-tube type Coriolis flow meter is provided for measuring mass flow. The flow meter includes a straight flow tube (4) through which the fluid being measured flows, a hollow outer tube (5) secured at both ends thereof to act as a counterbalance, a drive unit (7), and a pair of sensors. The flow tube (4) is caused to vibrate by the drive unit (7) so that the mass flow of the fluid is measured by detecting a phase difference proportional to Coriolis force acting on the flow tube (4) by the sensors. Sheet members (coupling plates 6) secure the flow tube (4) to both ends of the outer tube (5) and integrally form the coupling plate (6) with tube-assembly supporting leaf springs (14) in the double-tube type Coriolis flow meter. By connecting the flow tube to the outer tube via the sheet members in this manner, stresses produced between the tubes are absorbed and a uniform temperature distribution is maintained in the outer tube and manufacturing costs are reduced.

6 Claims, 2 Drawing Sheets

STRAIGHT DOUBLE-TUBE TYPE CORIOLIS FLOW METER

FIELD OF THE INVENTION

The present invention relates to a double-tube type Coriolis flow meter with counterbalancing outer tube.

BACKGROUND OF THE INVENTION

The Coriolis flow meter is designed to measure the mass flow of a flowing medium being measured taking advantage of the fact that when a measuring tube supported at both ends thereof, through which the medium being measured flows, is caused to vibrate, Coriolis force acting on the measuring tube is proportional to the mass flow of the medium being measured.

Now, a conventional double-tube type Coriolis flow meter will be described, referring to FIG. 4. The Coriolis flow meter is of a double-tube type having a hollow cylindrical outer housing 1 with connecting flanges 2 at both ends, in which a double straight-tube assembly comprising a flow tube 4 and an outer tube 5 is disposed coaxially with the outer housing 1. A fluid being measured flows in the straight flow tube 4, and a counterweight 10 is mounted at the center of the hollow straight outer tube 5. Both the flow tube 4 and the outer tube 5 are coaxially secured at both ends thereof to each other via coupling blocks 12, which are rigid bodies. The weight of the counterweight 10 is adjusted so that the natural frequency of the flow tube 4, with the coupling blocks 12 at both ends serving as supporting parts, becomes equal to the natural frequency of the outer tube 5.

At the center of the flow tube 4 and the outer tube 5 provided is a drive unit 7 for causing the flow tube 4 and the outer tube 5 to resonate with each other in opposite phases. A pair of sensors 8 are provided at symmetrical locations on both sides of the drive unit 7 to detect a phase difference produced in the flow tube by the Coriolis force.

This double-tube type Coriolis flow meter is of a simple and compact construction and capable of stably detecting a mass flow proportional to a phase difference produced by the Coriolis force.

In the double-tube type Coriolis flow meter, however, when a change in the temperature of the fluid being measured happens to cause a large temperature difference between the flow tube and the outer tube, thermal stress may be produced in the longitudinal direction of the tubes, causing the spring constant and accordingly. The natural frequency of the tubes to change. This could deteriorate the energy balance, making the resonance of the tubes difficult.

The Coriolis flow meter is usually associated with an error, called the instrumental error, between the true value, namely, the actual flow of a fluid, and the measured value as the result of measurement by an instrument. A commonly practiced method of efficiently correcting the instrumental error in the double-tube type Coriolis flow meter is to measure temperature or stress at a given point on the outer tube and make corrections based on the measurements. But if temperature distribution in the outer tube becomes uneven, accurate error correction cannot be accomplished. The use of coupling blocks 12 that are rigid bodies as used in the conventional type tends to cause an increase in local thermal conduction through the coupling blocks 12 at both ends, rather than even temperature distribution over the overall length, leading to an uneven temperature distribution in the outer tube.

Furthermore, although the vibration supporting ends are generally connected to the tubes by brazing, a large difference between the thermal capacities of the supporting ends and the tubes could make brazing procedures complex, leading to increased cost.

This invention is, therefore intended to solve these problems, and it is an object of this invention to provide a double-tube type Coriolis flow meter wherein the flow tube and the outer tube are connected to one another with sheet members to absorb stresses produced between tubes and limit local thermal conduction to ensure uniform temperature in the outer tube, and the thickness of the sheet members is made closer to that of the tubes to simplify brazing procedures and attain good brazing performances.

DISCLOSURE OF THE INVENTION

This invention was contrived under the aforementioned circumstances, and the double-tube type Coriolis flow meter according to this invention comprises a straight flow tube 4 in which the fluid being measured flows, a hollow outer tube 5 that is disposed concentrically outside the flow tube 4, secured at both ends to act as a counterbalance, a drive unit 7, and a pair of sensors 8. As the flow tube 4 is caused to vibrate by the drive unit 7, a phase difference proportional to the Coriolis force acting on the flow tube 4 is produced by the vibration. The phase difference is detected by the sensors 8 at both ends of the flow tube 4 to measure mass flow. This invention is characterized by a double-tube type Coriolis flow meter in which the flow tube 4 is fixedly fitted to both ends of the outer tube 5 via sheet members.

In this invention, resonance is stably maintained without changing the spring constant due to thermal stress and changing the natural frequency of the tubes since the stress produced between the tubes is absorbed by connecting the flow tube and the outer tube at both ends via sheet members. Furthermore, the use of sheet members helps reduce thermal conduction due to its thin thickness, increasing the ratio of uniform thermal conduction in the longitudinal direction through a space between the flow tube and the outer tube. This contributes to making the temperature of the outer tube uniform. As a result, it is possible to correct the instrumental errors more accurately since temperature measurement at a point on the outer tube to correct instrumental errors becomes more accurate. In addition, by making the thickness of the sheet members closer to that of the tubes, the thermal capacities of them can be made almost equal, leading to simplified brazing procedures and improved brazing performance.

The double-tube type Coriolis flow meter according to this invention is characterized by its construction where the sheet members are formed into a disc shape so as to close the gap between the concentrically disposed flow tube 4 and outer tube 5, with the outer periphery of the flow tube 4 brazed to the inner periphery of the outer tube 5. By forming the sheet members into a disc shape, this invention makes it possible to realize positive brazing with sufficient mechanical strength while maintaining a thin thickness enough to make thermal conduction through the sheet members difficult.

Furthermore, the double-tube type Coriolis flow meter according to this invention is characterized by its construction where the sheet members symmetrically extended toward the outside of the outer tube 5 in the radial direction to form leaf springs 14, with the ends thereof fixedly fitted to the outer housing 1. With this construction, leaf springs 14 of a simple construction can be provided to ensure stable vibration. Forming the coupling plates and the leaf springs into an integral structure helps reduce the number of parts, leading to reduced manufactured cost. Complete agreement of the supporting points of the flow tube and the outer tube with the supporting points of the entire tube assembly ensures stable vibration, leading to a high-performance Coriolis flow meter manufactured at low cost.

BEST MODE FOR CARRYING OUT THE INVENTION

Figure 1:
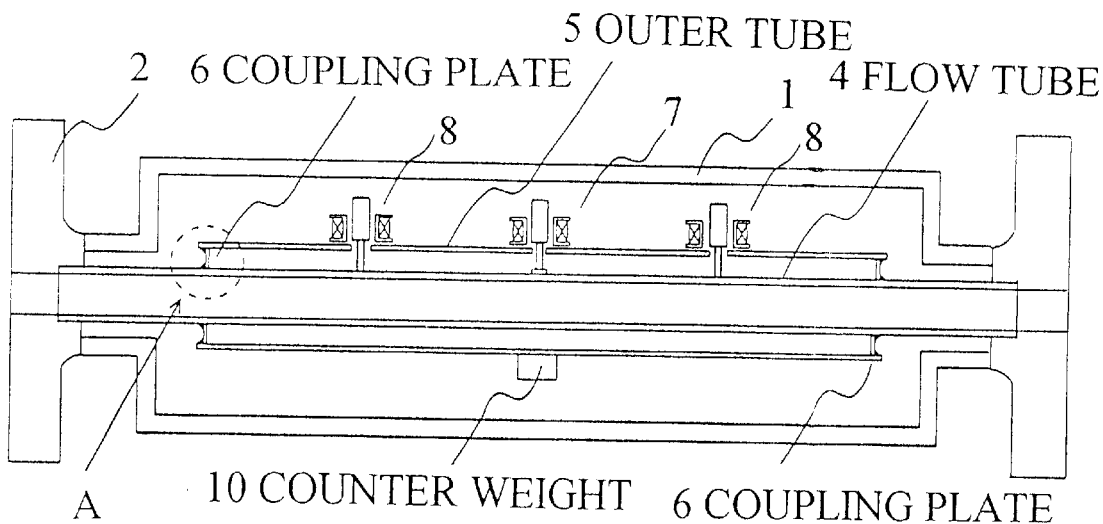
FIG. 1 shows an example of a double-tube type Coriolis flow meter to which this invention is applied.

In the following, this invention will be described in detail, referring to the accompanying drawings. FIG. 1 shows an example of a double-tube type Coriolis flow meter to which this invention is applied. The double-tube type Coriolis flow meter has a hollow cylindrical outer housing 1 having connecting flanges 2 at both ends. Inside the outer housing 1 disposed is a straight flow tube 4 through which the fluid being measured flows, made of stainless steel, Hastelloy, titanium alloy, for example. Outside the flow tube 4 concentrically secured is a hollow outer tube 5 at both ends thereof via sheet members (coupling plates 6) in such a manner as to form a concentric dual tube assembly except for both ends in the longitudinal direction, as will be described in detail later. The locations at which the flow tube 4 and the outer tube 5 are connected serve as supporting points. The outer tube 5 is made of a resilient material, such as stainless steel, Hastelloy and titanium alloy, and has at the middle thereof a counterweight 10 having a counterbalancing function.

Vibration of the flow tube 4, and detection of the phase difference produced by the Coriolis force caused by the vibration are achieved in the normal manner. That is, a drive unit 7 mounted on the outer tube 5 causes the flow tube 4 to vibrate in the primary mode of the natural frequency thereof. As the fluid flows in the flow tube 4, Coriolis forces are generated in opposite directions in the inflow and the outflow sides, with the central portion, at which the vibration speed becomes maximum, as the boundary. This results in deflection of the flow tube in an undulated manner. This undulated deflection is called the secondary-mode component. The flow tube is thus subjected to displacement as a result of superposition of the primary-mode vibration due to the vibration caused by the drive unit and the secondary-mode vibration due to the Coriolis force. A pair of sensors 8 are installed on the outer tube 5 at positions on both sides of the drive unit 7 at which the secondary-mode component becomes maximum, so that the phase difference of the flow tube 4 due to the Coriolis force is detected to determine the mass flow of the fluid being measured.

Figure 2A:
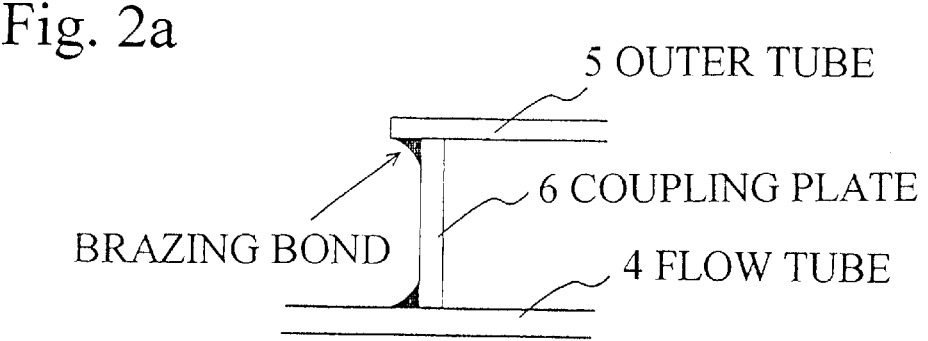
FIG. 2 is an enlarged detailed view of the connecting part of the flow tube and the outer tube encircled and marked with A in FIG. 1.

FIG. 2(a) is an enlarged detailed view of the connecting part, or the supporting point, of the flow tube 4 and the outer tube 5, encircled and marked with A in FIG. 1. In this invention, a sheet member, as exemplified by the coupling plate 6, is used to connect the flow tube 4 and the outer tube 5. Whereas the thinner the sheet member the more favorable from the viewpoint of heat conduction, as will be described later, it should preferably have a thickness similar to that of both tubes to ensure a strong brazing bond from the viewpoint of mechanical strength necessary to support the outer tube. Similarly, from the viewpoint of mechanical strength and strong brazing bond, the coupling plate 6 should preferably be of a disc shape closing the gap between the flow tube 4 and the outer tube 5 disposed concentrically with one another.

Figure 2B:
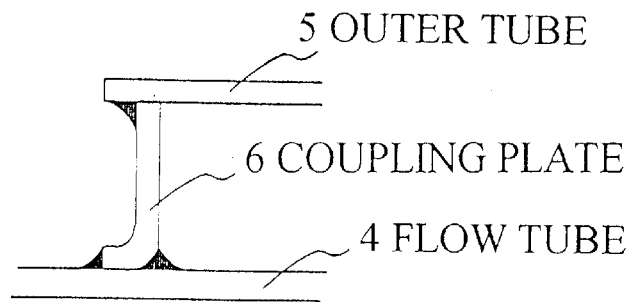

Similarly to FIG. 2(a), FIG. 2(b) is an enlarged detailed view of the connecting part, which serves as a supporting point, of the flow tube 4 and the outer tube 5. The part of the coupling plate 6 to which the flow tube 4 is connected can be pressed into a shape as shown in the figure to obtain stable brazing strength.

This coupling plate 6 is made of stainless steel, Hastelloy, titanium alloy, etc. As shown in the figure, the flow tube 4 and the outer tube 5 are integrally secured at both ends thereof to form a vibration supporting point via the coupling plate 6 by brazing the coupling plate 6 to the outer periphery of the flow tube 4, and to the inner periphery of the outer tube 5, respectively.

For the brazing material, gold, nickel, silver, vanadium, etc. can be used. Although an example where the inner periphery of the outer tube 5 is brazed to the outer periphery of the coupling plate 6 is shown in the figure, the outer periphery of the coupling plate 6 can be made contact with, and brazed to, the butt end of the outer tube 5. Furthermore, welding, adhesive bonding or other appropriate means may be used in place of brazing.

According to this invention, thermal stress can be absorbed by connecting the flow tube 4 and the outer tube 5 using sheet members. If the temperature of the fluid changes, the flow tube 4 in which the fluid flows immediately follows that temperature change, while a delay is caused in the temperature response of the outer tube 5 which is outside the flow tube 4. That is, a temperature difference occurs between the flow tube 4 and the outer tube 5, and thermal stress is caused due to the difference in elongation between the flow tube 4 and the outer tube 5 resulting from the temperature difference. According to this invention, this thermal stress can be absorbed by the resiliency of the aforementioned coupling plates 6. Thus, resonance can be stably maintained without changes in the spring constant due to thermal stress and in the natural frequency of the tubes.

According to this invention, uniform temperature distribution in the outer tube 5 can be maintained by connecting the tubes using the coupling plates 6. As described above, if the fluid temperature changes, the temperature of the flow tube 4 that also changes according to the change in the fluid temperature is transmitted to the outer tube 5 via a space (air that exists there and radiation) between the concentrically disposed two tubes, and through the heat conduction of the coupling plates 6. Whereas the heat conduction through the space between both tubes is uniform in the longitudinal direction, the heat conduction via the coupling plates 6 is realized only from both ends. This may cause uneven temperature distribution. In this invention, the use of sheet members as the coupling plates 6, in place of rigid blocks used in the prior art, can reduce the heat conduction via the coupling plates 6, which might have caused uneven temperature distribution, compared with the uniform heat conduction through the space between both tubes. Thus, temperature distribution in the outer tube as a whole can be made uniform, and a more accurate value for the temperature measured at a point on the outer tube to correct instrumental errors can be obtained. As a result, instrumental errors can be corrected more accurately.

Figure 3:
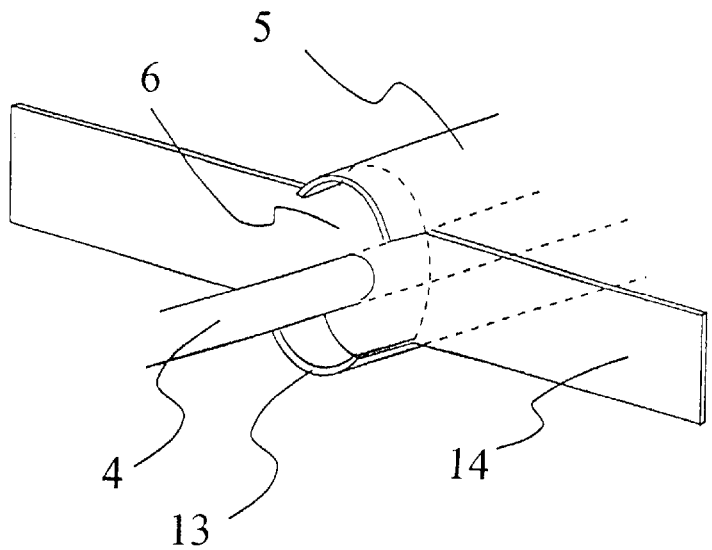
FIG. 3 is a partially enlarged view of the connecting part of the flow tube and the outer tube, representing another example of the Coriolis flow meter to which this invention is applied.
Figure 4:
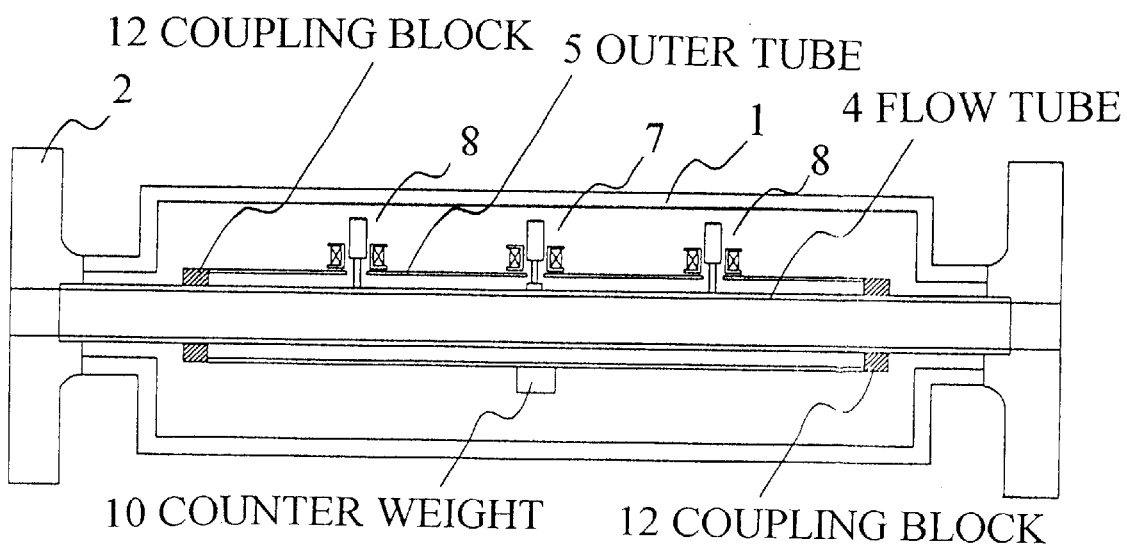
FIG. 4 shows a double-tube type Coriolis flow meter of a prior art.

FIG. 3 is a partially enlarged view of the connecting part of the flow tube and the outer tube shown in another example of a Coriolis flow meter to which this invention is applied. In the figure, numeral 14 refers to a leaf spring integrally formed with the coupling plate 6.

In a double-tube type, it is known that supporting the vibration fulcrums by the outer housing 1 via a leaf spring 14 can reduce the effects of changes in the characteristics of the supporting part, leading to stable vibration. In the example shown, the leaf spring 14 is formed by extending the coupling plate 6 symmetrically toward the right and left sides up to the outside of the outer tube 5 in the radial direction. In other words, a piece of sheet metal is commonly used for both the leaf spring 14 and the coupling plate 6. By doing so, it is possible to form a sheet-metal part of a simple construction having both the functions of the coupling plate 6 and the leaf spring 14. With this sheet-metal part, brazing can be performed easily. As shown in the figure, the left and right parts of the outer tube 5 are cut away, with the upper and lower parts left uncut as protruded parts 13. Brazing is carried out by fitting the integrally formed coupling plate 6 and leaf spring 14 into the cut-away portions. The other ends of the leaf spring 14 are fixedly fitted to the outer housing 1 with appropriate means, such as brazing.

In the example shown, it is assumed that vibration is caused in the vertical direction in the figure, and accordingly the leaf spring 14 is extended in the horizontal direction perpendicular to the direction of vibration. The direction in which the leaf spring 14 is extended, however, may be in the same direction as that of vibration, namely in the vertical direction, or in four radial directions.

INDUSTRIAL APPLICABILITY

As described above, the double-tube type Coriolis flow meter according to this invention having a counterbalancing outer tube can absorb the stress generated between the flow tube and the outer tube and make the temperature of the outer tube uniform by limiting local thermal conduction.

What is claimed is:

1. A double-tube type Coriolis flow meter comprising:
   a straight flow tube defining a space through which the fluid being measured flows;
   a hollow outer tube disposed concentrically outside said flow tube, said hollow outer tube having a first end and a second end;
   a first sheet member securing said flow tube to said first end of said outer tube;
   a second sheet member securing said flow tube to said second end of said outer tube such that with said first end and said second end secured to said flow tube, said outer tube functions as a counterbalance, each of said first sheet member and said second sheet member having a resiliency so as to absorb a difference in elongation between said flow tube and said outer tube which is caused due to thermal stress;
   a drive unit; and
   a pair of sensors, said flow tube being caused to vibrate by said drive unit so that the mass flow of said fluid being measured is measured by detecting with said sensors a phase difference proportional to Coriolis force acting on said flow tube as a result of the vibration.

2. A double-tube type Coriolis flow meter as set forth in claim 1, wherein said sheet member is formed into a disc shape closing the gap between said concentrically disposed flow tube and said outer tube, and fixedly fitted to the outer periphery of said flow tube and the inner periphery of said outer tube.

3. A double-tube type Coriolis flow meter as set forth in claim 1, further comprising an outer housing, each of said sheet members respectively symmetrically extending outwardly of said outer tube in a radial direction to form leaf springs, with the ends of each of said leaf springs respectively fixedly fitted to the outer housing.

4. A double-tube type Coriolis flow meter as set forth in claim 2, further comprising an outer housing, each of said sheet members respectively symmetrically extending outwardly of said outer tube in a radial direction to form leaf springs, with the ends of each of said leaf springs respectively fixedly fitted to the outer housing.

5. A double-tube type Coriolis flow meter comprising:
   an outer housing;
   a straight flow tube defining a space through which the fluid being measured flows;
   a hollow outer tube disposed concentrically outside said flow tube, said hollow outer tube having a first end and a second end;
   a first sheet member securing said flow tube to said first end of said outer tube, said first sheet member having a first sheet radial extension with radial extension ends extending symmetrically radially outwardly of said hollow outer tube to form leaf springs, said radial extension ends being respectively fixedly fitted to said outer housing;
   a second sheet member securing said flow tube to said second end of said outer tube such that with said first end and said second end secured to said flow tube, said outer tube functions as a counterbalance, said second sheet member having a second sheet radial extension with second sheet radial extension ends extending symmetrically radially outwardly of said hollow outer tube to form leaf springs, said second sheet radial extension ends being respectively fixedly fitted to said outer housing, each of said first sheet member and said second sheet member having a resiliency so as to absorb a difference in elongation between said flow tube and said outer tube which is caused due to thermal stress;
   a drive unit and thermal stress;
   a pair of sensors, said flow tube being caused to vibrate by said drive unit so that the mass flow of said fluid being measured is measured by detecting with said sensors a phase difference proportional to Coriolis force acting on said flow tube as a result of the vibration.

6. A double-tube type Coriolis flow meter comprising:
   an outer housing;
   a straight flow tube defining a space through which the fluid being measured flows;
   a hollow outer tube disposed concentrically outside said flow tube, said hollow outer tube having a first end and a second end;
   a first sheet member securing said flow tube to said first end of said outer tube, said first sheet member having an annular disc shape closing the gap between said concentrically disposed flow tube and said outer tube, and fixedly fitted to the outer periphery of said flow tube and the inner periphery of said outer tube and having a first sheet radial extension with radial extension ends extending symmetrically radially outwardly of said hollow outer tube to form leaf springs, said radial extension ends being respectively fixedly fitted to said outer housing;

a second sheet member securing said flow tube to said second end of said outer tube, said second sheet member having an annular disc shape closing the gap between said concentrically disposed flow tube and said outer tube, and fixedly fitted to the outer periphery of said flow tube and the inner periphery of said outer tube such that with said first end and said second end secured to said flow tube, said outer tube functions as a counterbalance, said second sheet member having a second sheet radial extension with second sheet radial extension ends extending symmetrically radially outwardly of said hollow outer tube to form leaf springs, said second sheet radial extension ends being respectively fixedly fitted to said outer housing, each of said first sheet member and said second sheet member having a resiliency so as to absorb a difference in elongation between said flow tube and said outer tube which is caused due to thermal stress;

a drive unit; and a pair of sensors, said flow tube being caused to vibrate by said drive unit so that the mass flow of said fluid being measured is measured by detecting with said sensors a phase difference proportional to Coriolis force acting on said flow tube as a result of the vibration.

* * * * *